United States Patent
Ueda et al.

(10) Patent No.: US 10,787,529 B2
(45) Date of Patent: Sep. 29, 2020

(54) VINYL POLYMER POWDER, THERMOPLASTIC RESIN COMPOSITION, AND MOLDED BODY THEREOF

(71) Applicant: Mitsubishi Chemical Corporation, Tokyo (JP)

(72) Inventors: Masahiro Ueda, Otake (JP); Shinji Matsuoka, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/249,660

(22) Filed: Jan. 16, 2019

(65) Prior Publication Data

US 2019/0169336 A1    Jun. 6, 2019

Related U.S. Application Data

(62) Division of application No. 15/120,261, filed as application No. PCT/JP2015/058506 on Mar. 20, 2015, now Pat. No. 10,221,268.

(30) Foreign Application Priority Data

Mar. 20, 2014 (JP) ................................ 2014-058378

(51) Int. Cl.
*C08F 212/08* (2006.01)
*C08J 3/16* (2006.01)
(Continued)

(52) U.S. Cl.
CPC .......... *C08F 212/08* (2013.01); *C08F 220/18* (2013.01); *C08J 3/16* (2013.01);
(Continued)

(58) Field of Classification Search
CPC ..................................... C08J 3/16; C08F 6/22
See application file for complete search history.

(56) References Cited

U.S. PATENT DOCUMENTS 3,331,825 A    7/1967 Tominaga et al.
5,514,772 A    5/1996 Suzuki et al.
(Continued)

FOREIGN PATENT DOCUMENTS

EP    0 406 630 A1    1/1991
JP    63-099263 A    4/1988
(Continued)

OTHER PUBLICATIONS

International Search Report issued in corresponding International Application No. PCT/JP2015/058506, dated Jun. 16, 2015.
(Continued)

*Primary Examiner* — Mark S Kaucher
(74) *Attorney, Agent, or Firm* — Morgan, Lewis & Bockius LLP (57) ABSTRACT

This vinyl polymer powder, which contains a vinyl polymer, has a glass transition temperature of at least 0° C. (where if there are a plurality of glass transition points, all of the glass transition temperatures are at least 0° C.), has no greater than 350 ppm of the total content of magnesium ions, calcium ions, aluminum ions, barium ions, and zinc ions, has no greater than 100 ppm of the content of ammonium ions, has an acid number of no greater than 2.5 mgKOH/g, and has a bulk density of 0.10-0.60 g/cm$^3$.

16 Claims, 1 Drawing Sheet

(51) Int. Cl.
  *C08L 69/00* (2006.01)
  *C08L 77/00* (2006.01)
  *C08L 101/00* (2006.01)
  *C08F 220/18* (2006.01)
  *C08L 25/14* (2006.01)
  *C08L 67/00* (2006.01)
  *C08L 33/06* (2006.01)
  *C08L 77/02* (2006.01)
  *C08L 77/06* (2006.01)
  *C08L 77/10* (2006.01)

(52) U.S. Cl.
  CPC ............... *C08L 25/14* (2013.01); *C08L 67/00* (2013.01); *C08L 69/00* (2013.01); *C08L 77/00* (2013.01); *C08L 101/00* (2013.01); *C08J 2325/14* (2013.01); *C08L 33/06* (2013.01); *C08L 77/02* (2013.01); *C08L 77/06* (2013.01); *C08L 77/10* (2013.01); *C08L 2201/54* (2013.01)

(56) References Cited

U.S. PATENT DOCUMENTS

| | | | |
|---|---|---|---|
| 5,521,252 | A | 5/1996 | Matsuda et al. |
| 5,665,836 | A | 9/1997 | Tanaka et al. |
| 5,716,748 | A | 2/1998 | Hasegawa et al. |
| 6,323,259 | B1 | 11/2001 | Ikegami et al. |
| 2007/0213451 | A1 | 9/2007 | Nabeshima et al. |
| 2009/0036607 | A1 | 2/2009 | Hirai et al. |
| 2010/0160491 | A1* | 6/2010 | Armes ............... B01J 13/0047 523/202 |
| 2011/0009567 | A1 | 1/2011 | Matsuoka et al. |
| 2014/0088222 | A1* | 3/2014 | Ueda ............... C08F 6/22 523/352 |
| 2014/0296437 | A1 | 10/2014 | Hatae et al. |
| 2015/0045483 | A1* | 2/2015 | Ueda ............... C08F 2/24 524/120 |

FOREIGN PATENT DOCUMENTS

| | | | |
|---|---|---|---|
| JP | 6-172420 A | | 6/1994 |
| JP | 06-240009 A | | 8/1994 |
| JP | 06-256416 A | | 9/1994 |
| JP | 08176210 A | * | 7/1996 ............... C08F 2/26 |
| JP | H09-043893 A | | 2/1997 |
| JP | 10-67906 A | | 3/1998 |
| JP | 2000-063652 A | | 2/2000 |
| JP | 3103736 B2 | | 10/2000 |
| JP | 2002-055479 A | | 2/2002 |
| JP | 2003-246944 A | | 9/2003 |
| JP | 2010-229406 A | | 10/2010 |
| JP | 5138220 B2 | | 2/2013 |
| JP | 5164564 B2 | | 3/2013 |
| WO | 2005/030819 A1 | | 4/2005 |
| WO | 2009/113573 A1 | | 9/2009 |
| WO | 2013/062123 A1 | | 5/2013 |
| WO | WO 2013-129310 | * | 11/2013 |

OTHER PUBLICATIONS

Extended European Search Report for corresponding European Patent Application No. 15765557.2, dated Feb. 16, 2017.
Office Action issued in corresponding Japanese Patent Application No. 2015-517521, dated Aug. 7, 2018 (machine translation provided).
Office Action issued in corresponding Korean Patent Application No. 10-2016-7022960, dated Sep. 21, 2018 (machine translation provided.
Communication issued in corresponding European Patent Application No. 15765557.2, dated Sep. 25, 2018.
Screw feeder comprehensive technical site for equipment designers, Screw feeder.JP, http://www.screwfeeder.jp/technique/96 (Please see Notification dated Oct. 16, 2018; no publication date was provided).
Soken Chemical & Engineering Co., Ltd., Fine Particles, https://www.soken-ce.co.jp/product/fine_particles/mp/ (Please see Notification dated Oct. 16, 2018; no publication date was provided).
Notification of Submission of Information issued in corresponding Japanese Patent Application No. 2015-517521, dated Oct. 16, 2018.
Notification of Submission of Information issued in corresponding Japanese Patent Application No. 2015-517521, dated Nov. 6, 2018.
Office Action issued in corresponding Japanese Patent Application No. 2015-517521, dated Mar. 5, 2019 (machine translation provided).
Notification of Submission of Information issued in corresponding European Patent Application No. 15765557.2, dated Mar. 22, 2019.
Notification from the Japanese Patent Office dated Jun. 18, 2019 in corresponding Japanese Patent Application No. 2015-517521with English translation of same.
Office dated Oct. 1, 2019 in corresponding Japanese Patent Application No. 2015-517521with English translation of same.

* cited by examiner

VINYL POLYMER POWDER, THERMOPLASTIC RESIN COMPOSITION, AND MOLDED BODY THEREOF

TECHNICAL FIELD

The present invention relates to a vinyl polymer powder, a resin composition containing the same, and a molded body thereof.

The present application claims priority based on Japanese Patent Application No. 2014-058378, filed Mar. 20, 2014, and the contents of the application are incorporated herein by reference in their entirety.

BACKGROUND ART

Engineering plastics are excellent in mechanical properties, heat resistance, electrical properties, and the like, and have been used in various applications such as electrical/electronic equipment, home electrical appliances, and OA equipment. In recent years, in these applications, a molded body has become increasingly larger, thinner and more complex in shape, and thus, there is a demand for improvement in molding processability.

Melt flowability, melt tension, or the like is mentioned as an indicator of molding processability of the engineering plastic. When melt flowability is high, it is easy to obtain a molded body having a large size and/or a thin thickness at the time of injection molding. When melt tension is high, molding defects such as jetting at the time of injection molding and drawdown at the time of blow molding or vacuum molding are less likely to occur.

As the method of improving melt flowability at the time of molding process without impairing excellent properties (mechanical properties, heat resistance, and the like) of the engineering plastic, methods are proposed in which a powder prepared by coagulating a copolymer, which is obtained by subjecting an aromatic vinyl monomer and a phenyl methacrylate to emulsion polymerization, or a powder prepared by coagulating a copolymer, which is obtained by subjecting styrene and phenyl methacrylate to emulsion polymerization, in the presence of a copolymer, which is obtained by subjecting α-methyl styrene, styrene, and phenyl methacrylate to emulsion polymerization, is blended, as a flowability improver, in a polycarbonate resin serving as an engineering plastic (Patent Documents 1 and 2).

In addition, as the method of improving melt tension of the engineering plastic and preventing drawdown at the time of molding, methods are proposed in which a powder prepared by coagulating a high-molecular-weight acrylic polymer, which is polymerized by emulsion polymerization, is blended, as a melt tension improver, in an engineering plastic (Patent Documents 3 and 4).

However, since these flowability improver and melt tension improver have a high glass transition temperature, when a latex obtainable by emulsion polymerization is coagulated and a polymer powder is recovered, atomization of the powder or solidification failure is likely to occur. As a result, there is possibility that the powder flowability or the bulk density of the obtained powder is decreased, and thus a problem arises in improvement of powder property.

In addition, when a resin composition containing the flowability improver or the melt tension improver described above is molded at high temperature in order to achieve high melt flowability, there is a concern that foreign substances remaining in the flowability improver or the melt tension improver impair the appearance, the mechanical strength, or the like of the molded body. From this reason, in the resin composition, there is also a strong demand for improvement in thermal stability at high-temperature molding.

CITATION LIST

Patent Document

Patent Document 1: WO 2005/030819 A
Patent Document 2: WO 2009/113573 A
Patent Document 3: JP 2000-63652 A
Patent Document 4: JP 63-99263 A

SUMMARY OF THE INVENTION

Problem to be Solved by the Invention

An object of the invention is to provide a vinyl polymer powder which is mixed with an engineering plastic so that a resin composition having excellent molding processability and high thermal stability at the time of high-temperature molding can be obtained and which is also excellent in the powder property.

Another object of the invention is to provide a thermoplastic resin composition having excellent molding processability and high thermal stability at the time of high-temperature molding and a molded body using the same.

Means for Solving Problem

The above-described problems are solved by the following inventions [1] to [14].

[1] A vinyl polymer powder containing a vinyl polymer, in which a glass transition temperature of the vinyl polymer is 0° C. or higher (provided that, when there are a plurality of glass transition points, all of the glass transition temperatures are 0° C. or higher), the total content of magnesium ions, calcium ions, aluminum ions, barium ions, and zinc ions is 350 ppm or less with respect to the total mass of the vinyl polymer powder, the content of ammonium ions is 100 ppm or less with respect to the total mass of the vinyl polymer powder, an acid value is 2.5 mgKOH/g or less, and a bulk density is 0.10 to 0.60 g/cm$^3$.

[2] The vinyl polymer powder described in [1], in which free flow property as measured by the following method is 15 g/10 sec or more.

[Measurement Method for Free Flow Property]

A measurement instrument, which includes a seat on which a tray is set, a funnel provided with a shutter at a cylindrical opening thereof, a support holding the funnel above the seat, and a support rod to which the support is fixed, is placed in a horizontal site. The shutter of the funnel is closed, and 120 cm$^3$ of powder is uniformly put into the funnel. Subsequently, the shutter is opened to drop the powder, and immediately, the tray is set on the seat. At the same time of setting the tray, the counting of time starts by using a stopwatch, and after 10 seconds, the tray is removed from the measurement instrument. The tray containing the powder is weighed to obtain the amount of the powder dropped for 10 seconds. The above measurement is carried out two times, and an average value of the amounts of the powder dropped for 10 seconds is obtained and this value is designated as the free flow property (g/10 sec).

[3] The vinyl polymer powder described in [1] or [2], in which the total content of sodium ions and potassium ions is 100 ppm or less with respect to the total mass of the vinyl polymer powder.

[4] The vinyl polymer powder described in any one of [1] to [3], in which the vinyl polymer contains a (meth)acrylate ester unit which contains an alkyl group having 1 to 4 carbon atoms or an aromatic group in an ester moiety.
[5] The vinyl polymer powder described in any one of [1] to [4], in which 0.5 to 99.5% by mass of an aromatic vinyl monomer unit is contained in the total mass of the monomer unit that constitutes the vinyl polymer.
[6] The vinyl polymer powder described in any one of [1] to [5], in which a mass average molecular weight of the vinyl polymer is 5,000 to 20,000,000.
[7] The vinyl polymer powder described in any one of [1] to [6], in which a mass average molecular weight of the vinyl polymer is 5,000 to 200,000.
[8] A thermoplastic resin composition containing: 70 to 99.9% by mass of an engineering plastic; and 0.1 to 30% by mass of the vinyl polymer powder described in any one of [1] to [7].
[9] The thermoplastic resin composition described in [8], in which the engineering plastic is at least one resin selected from polyamide, polyester, and polycarbonate.
[10] A molded body being formed by molding the thermoplastic resin composition described in [8] or [9].
[11] A vinyl polymer powder containing: 0.5 to 99.5% by mass of a (meth)acrylate ester unit which contains an alkyl group having 1 to 4 carbon atoms or an aromatic group in an ester moiety; 0.5 to 99.5% by mass of an aromatic vinyl monomer unit; and a vinyl polymer having a glass transition temperature of 0° C. or higher (provided that, when there are a plurality of glass transition points, all of the glass transition temperatures are 0° C. or higher), in which the vinyl polymer powder satisfies the following Conditions [1] and [2].
Condition [1]
A bulk density as measured according to JIS K6720 is 0.30 to 0.60 g/cm³.
Condition [2]
Free flow property as measured by the following method is 15 g/10 sec or more.
[Measurement Method for Free Flow Property]
A measurement instrument, which includes a seat on which a tray is set, a funnel provided with a shutter at a cylindrical opening thereof, a support holding the funnel above the seat, and a support rod to which the support is fixed, is placed in a horizontal site. The shutter of the funnel is closed, and 120 cm³ of powder is uniformly put into the funnel. Subsequently, the shutter is opened to drop the powder, and immediately, the tray is set on the seat. At the same time of setting the tray, the counting of time starts by using a stopwatch, and after 10 seconds, the tray is removed from the measurement instrument. The tray containing the powder is weighed to obtain the amount of the powder dropped for 10 seconds. The above measurement is carried out two times, and an average value of the amounts of the powder dropped for 10 seconds is obtained and this value is designated as the free flow property (g/10 sec).
[12] A method for producing a vinyl polymer powder, the method including the following Step (1) and Step (2).
Step (1): a step of obtaining a vinyl polymer latex having a glass transition temperature of 0° C. or higher (provided that, when there are a plurality of glass transition points, all of the glass transition temperatures are 0° C. or higher) by subjecting a vinyl monomer to emulsion polymerization in the presence of a non-ionic/anionic emulsifier.
Step (2): a step of preparing a slurry having a pH of 6 or less by coagulating the vinyl polymer latex, then generating a precipitate, and recovering the precipitate as a vinyl polymer powder.
[13] The method for producing a vinyl polymer powder described in [12], in which an ionic hydrophilic moiety of the non-ionic/anionic emulsifier is carboxylic acid or a salt thereof, or phosphoric acid or a salt thereof.
[14] The method for producing a vinyl polymer powder described in [12], in which the vinyl polymer latex is coagulated using an acid in Step (2).
[15] The method for producing a vinyl polymer powder described in [12], in which a pH of the slurry in Step (2) is 4 or less.

Effect of the Invention

According to the invention, it is possible to provide a vinyl polymer powder which is mixed with an engineering plastic so that a resin composition having excellent molding processability and high thermal stability at the time of high-temperature molding can be obtained and which is also excellent in powder property. In addition, it is possible to provide a thermoplastic resin composition having excellent molding processability and high thermal stability at the time of high-temperature molding and a molded body using the same.

MODE(S) FOR CARRYING OUT THE INVENTION

Hereinafter, embodiments of the invention will be described in detail.
[Vinyl Polymer Powder]
A vinyl polymer powder in a first embodiment of the invention is a vinyl polymer powder containing a vinyl polymer, in which a glass transition temperature of the vinyl polymer is 0° C. or higher, the total content of magnesium ions, calcium ions, aluminum ions, barium ions, and zinc ions is 350 ppm or less with respect to the total mass of the vinyl polymer powder, the content of ammonium ions is 100 ppm or less with respect to the total mass of the vinyl polymer powder, an acid value is 2.5 mgKOH/g or less, and a bulk density is 0.10 to 0.60 g/cm³.
[Glass Transition Temperature]
The vinyl polymer in the first embodiment of the invention has a glass transition temperature of 0° C. or higher. When the glass transition temperature of the vinyl polymer is 0° C. or higher, the heat distortion temperature of a resin composition mixed with an engineering plastic is difficult to decrease. From the above point of view, the glass transition temperature of the vinyl polymer is preferably 30° C. or higher, more preferably 60° C. or higher, still more preferably 70° C. or higher, particularly preferably 80° C. or higher, and most preferably 90° C. or higher. In addition, from the viewpoint that the powder is easily recovered, the glass transition temperature of the vinyl polymer is preferably 200° C. or lower, more preferably 150° C. or lower, and still more preferably 120° C. or lower. Specifically, the glass transition temperature of the vinyl polymer is preferably 30 to 150° C. and more preferably 60 to 120° C.
In the invention, the glass transition temperature can be measured by the following method.
The glass transition temperature of the polymer is measured using a differential scanning calorimeter (DSC) (model name "DSC6200" manufactured by Seiko Instruments Inc.) according to JIS K7121. The numerical value of the extrapolated glass transition initiating temperature is used as the glass transition temperature.

The glass transition temperature of the vinyl polymer can be appropriately controlled by a commonly used method. For example, the glass transition temperature of the vinyl polymer can be controlled within a desired range by properly selecting the type of the monomer component used for polymerization, the composition ratio of monomer components that constitute the polymer, and the molecular weight of the polymer, and the like.

In order to obtain a vinyl polymer having a glass transition temperature of 0° C. or higher, it is sufficient only to polymerize a monomer mixture containing a monomer having a homopolymer glass transition temperature of 0° C. or higher. The homopolymer glass transition temperature may be a standard analysis value described in "POLYMER HANDBOOK" published by Wiley, or the like.

The glass transition temperature of the vinyl polymer is generally determined by the composition ratio of the monomer component that constitutes the polymer; however, the glass transition temperature of the vinyl polymer also varies depending on the molecular weight of the polymer. Specifically, as the molecular weight of the polymer is higher, the glass transition temperature becomes higher, and as the molecular weight is lower, the glass transition temperature becomes lower.

[Metal Ions]

The total content of magnesium ions, calcium ions, aluminum ions, barium ions, and zinc ions contained in the vinyl polymer powder in the first embodiment of the invention is 350 ppm or less with respect to the total mass of the vinyl polymer powder. When the total content of the metal ions contained in the vinyl polymer powder is high, at the time of being blended in an engineering plastic, particularly, polyester and polycarbonate, the metal ions are extruded and then catalytically decompose the resin by, for example, heat and/or moisture at the time of molding, and thus thermal stability at the time of high-temperature molding is deteriorated.

From the above-described point of view, the total content of magnesium ions, calcium ions, aluminum ions, barium ions, and zinc ions contained in the vinyl polymer powder is preferably 100 ppm or less, more preferably 50 ppm or less, still more preferably 25 ppm or less, and most preferably 10 ppm or less, with respect to the total mass of the vinyl polymer powder.

Further, the total content of sodium ions and potassium ions contained in the vinyl polymer powder of the invention is preferably 100 ppm or less, more preferably 50 ppm or less, still more preferably 40 ppm or less, and particularly preferably 30 ppm or less, with respect to the total mass of the vinyl polymer powder. When the sum of sodium ions and potassium ions in the vinyl polymer powder is 100 ppm or less, thermal stability at the time of high-temperature molding a resin composition blended in an engineering plastic, particularly, polyester and polycarbonate, is excellent.

The content of the metal ions in the vinyl polymer powder can be measured by the following method.

First, 1 g of a sample is measured in a platinum dish, subjected to dry incineration using an electric heater, and dissolved with hydrochloric acid and distilled water, and the resultant solution is diluted to 50 ml by distilled water to serve as a test solution. To this test solution, an ICP emission spectrometer (model name "IRIS Intrepid II XSP" manufactured by Thermo Fisher Scientific Inc.) is used to quantify the amount of metal ions.

[Ammonium Ions]

The content of the ammonium ions contained in the vinyl polymer powder in the first embodiment of the invention is 100 ppm or less with respect to the total mass of the vinyl polymer powder. When the total contents of the ammonium ions contained in the vinyl polymer powder is high, at the time of being blended in an engineering plastic, particularly, polyester and polycarbonate, the ammonium ions are extruded and then catalytically decompose the resin by, for example, heat and/or moisture at the time of molding, and thus thermal stability at the time of high-temperature molding is deteriorated.

From the above point of view, the content of the ammonium ions is preferably 10 ppm or less.

The content of the ammonium ions in the vinyl polymer powder can be measured by the following method.

A sample is pulverized and then weighed in a measuring flask. Distilled water is added thereto and the resultant mixture is subjected to ultrasonic treatment to extract ammonium ions. The extracted ammonium ions are quantified with an ion chromatographic analyzer (model name "IC-2010" manufactured by Tosoh Corporation).

[Acid Value]

The acid value of the vinyl polymer powder in the first embodiment of the invention is 2.5 mgKOH/g or less. When the acid value of the vinyl polymer powder is higher than a defined value, at the time of being blended in an engineering plastic, particularly, polyester and polycarbonate, the vinyl polymer powder catalytically decomposes the resin by, for example, heat and/or moisture, and thus thermal stability at the time of high-temperature molding is deteriorated. From the above point of view, the acid value of the vinyl polymer powder is preferably 2.0 mgKOH/g or less. More specifically, the acid value is preferably 0 to 2.5 mgKOH/g and more preferably 0 to 2.0 mgKOH/g.

The acid value of the vinyl polymer powder can be measured by the following method, for example.

10 g of a vinyl polymer powder sample is added to 30 ml of toluene, and the resultant mixture is stirred at room temperature and completely dissolved. After the mixture is dissolved, 40 ml of a mixed solution of toluene/ethanol=50/50% by volume is added thereto to dilute the mixture. The obtained vinyl polymer solution is titrated with an ethanolic potassium hydroxide solution to pH 12. A solvent is not particularly limited as long as it can dissolve the vinyl polymer powder, and examples thereof include dimethylformamide, dimethylsulfoxide, dimethylacetamide, N-methylpyrrolidone, acetone, methyl ethyl ketone, cyclohexanone, xylene, toluene, chlorobenzene, benzene, cresol, chloroform, dichloromethane, diethyl ether, tetrahydrofuran, dioxane, ethanol, butanol, isopropanol, hexane, heptane, cyclohexane, ethyl acetate, acetonitrile, and water. Further, these solvents may be used singly or in combination of two or more kinds thereof.

The vinyl polymer powder in which the total content of magnesium ions, calcium ions, aluminum ions, barium ions, and zinc ions is 350 ppm or less, the content of ammonium ions is 100 ppm or less, and the acid value is 2.5 mgKOH/g or less is obtained in such a manner that a vinyl monomer is polymerized by emulsion polymerization, miniemulsion polymerization, fine suspension polymerization, or the like, and in a case where the emulsion of the obtained polymer is recovered as a powder, foreign substances remaining in the powder are reduced. As the above-described method, for example, there are mentioned a method in which a slurry having a pH of 6 or less by coagulating a latex of a polymer obtained by subjecting a vinyl monomer to emulsion polymerization in the presence of a non-ionic/anionic emulsifier is prepared and the precipitated vinyl polymer is recovered as a powder, a method in which the used amount of an auxiliary material used for polymerization of a vinyl monomer and powder recovery is reduced, and a method in which a vinyl polymer powder is washed with a large amount of water and/or a solvent. Incidentally, the term "auxiliary material" means a raw material other than the vinyl monomer to be used in production of the vinyl polymer powder. Among these methods, from the viewpoint of having excellent industrial productivity, it is preferable to employ a method in which a slurry having a pH of 6 or less by coagulating a latex of a polymer obtained by subjecting a vinyl monomer to emulsion polymerization in the presence of a non-ionic/anionic emulsifier is prepared and the precipitated vinyl polymer is recovered as a powder.

[Bulk Density]

The bulk density of the vinyl polymer powder in the first embodiment of the invention is 0.10 to 0.60 g/cm$^3$. When the bulk density of the vinyl polymer powder is 0.10 g/cm$^3$ or more, excellent powder handling property is achieved. From the above point of view, the bulk density of the vinyl polymer powder is preferably 0.20 g/cm$^3$ or more and more preferably 0.30 g/cm$^3$ or more. Specifically, the bulk density is preferably 0.20 to 0.60 g/cm$^3$ and more preferably 0.30 to 0.60 g/cm$^3$.

In the invention, the bulk density of the vinyl polymer powder indicates a value measured according to JIS K6720 after 0.1 g of zeolite powder is mixed with about 120 cm$^3$ of a sample.

[Free Flow Property]

The free flow property of the vinyl polymer powder in the first embodiment of the invention is preferably 15 g/10 sec or more. When the free flow property is 15 g/10 sec or more, excellent powder handling property is achieved. From the above point of view, the free flow property of the vinyl polymer powder is more preferably 20 g/10 sec or more.

Specifically, the free flow property is preferably 15 to 60 g/10 sec and more preferably 20 to 60 g/10 sec.

In the invention, the free flow property of the vinyl polymer powder refers to the free flow property obtained by the following measurement method.

Figure 1:
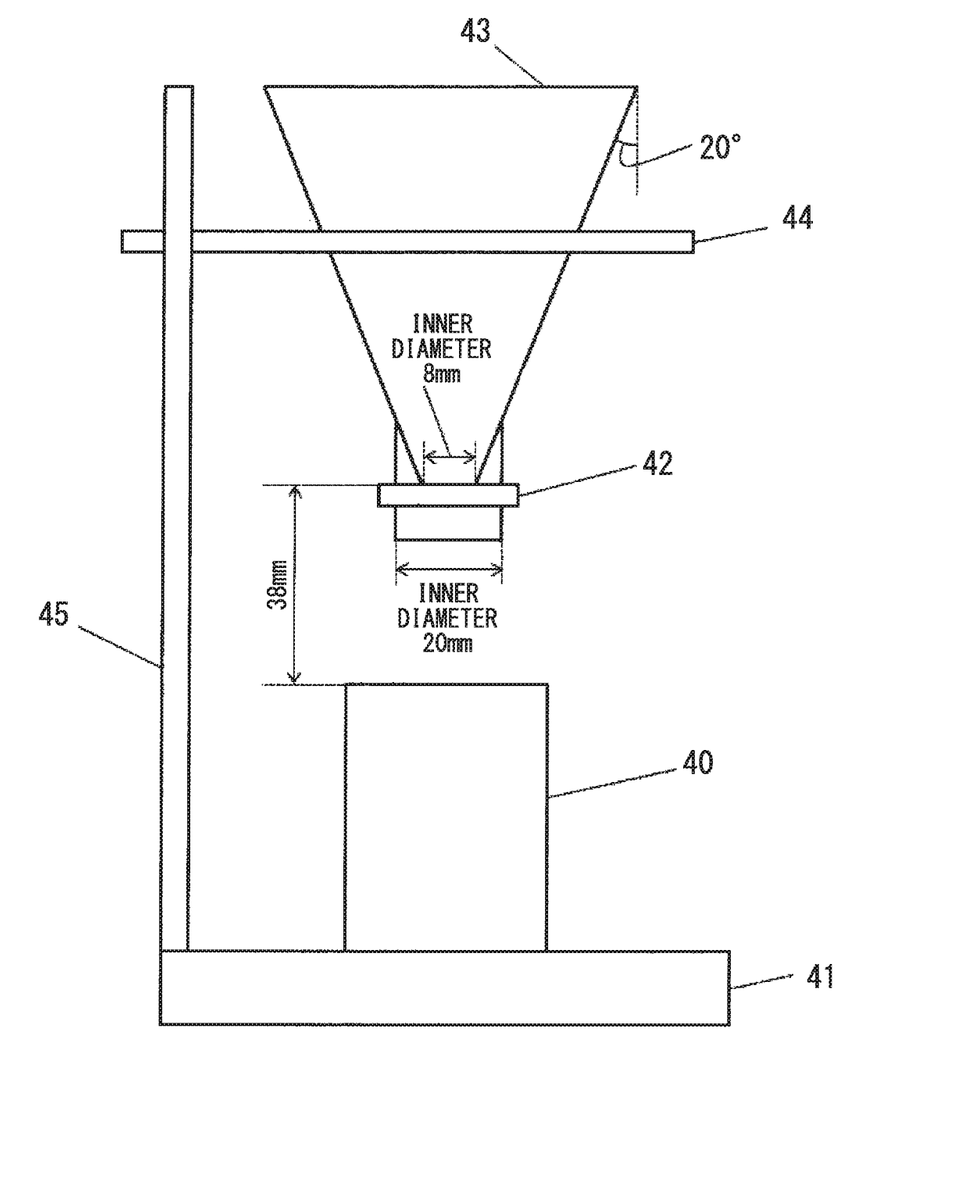
FIG. 1 illustrates a measurement instrument to be used in evaluation of free flow property.

FIG. 1 illustrates a measurement instrument used for evaluation of free flow property. This measurement instrument includes a seat 41 on which a tray 40 is set, a funnel 43 provided with a shutter 42 at the cylindrical opening thereof, a support 44 holding the funnel 43 above the seat 41, and a support rod 45 to which the support 44 is fixed. The shutter 42 enables the cylindrical opening of the funnel 43 to be opened and closed and is designed such that when the shutter 42 is opened, the powder in the funnel 43 is dropped on the tray 40. The support rod 45 is disposed perpendicularly to the seat 41 and is designed to hold the support 44 such that the support 44 is disposed horizontally to the seat 41. Herein, the inner diameter of the upper part of the cylindrical opening in the funnel 43 is 8 mm, the inner diameter of the lower part of the cylindrical opening in the funnel 43 is 20 mm, and the angle of the side surface of the opening of the funnel 43 is 20°. The distance from the upper part of the cylindrical opening in the funnel to the tray 40 is 38 mm. The evaluation of free flow property using this measurement instrument is carried out as follows.

First, the measurement instrument is placed in a horizontal site, the shutter 42 of the funnel 43 is closed, and 120 cm$^3$ of powder is uniformly put into the funnel 43. Subsequently, the shutter is opened to drop the powder, and immediately, the tray 40 in which the tare (the weight of the tray 40 in an empty state) has been measured in advance is set on the seat 41. At the same time of setting the tray 40, the counting of time starts by using a stopwatch, and after 10 seconds, the tray 40 is removed from the measurement instrument. The tray containing the powder is weighed to obtain the amount (unit: g) of the powder dropped from the funnel onto the tray for 10 seconds. The above measurement is carried out two times, and an average value of the amounts of the powder dropped for 10 seconds is obtained and this value is designated as the free flow property (g/10 sec).

[Powder Particle Diameter]

In order to increase the bulk density and the free flow of the vinyl polymer powder containing a vinyl polymer having a glass transition temperature of 0° C. or higher (provided that, when there are a plurality of glass transition points, all of the glass transition temperatures are 0° C. or higher), the content of fine powder contained in the vinyl polymer powder is preferably small. Specifically, the content of a component, which has a particle diameter of 38 μm or less, contained in the vinyl polymer powder is preferably 0 to 15% by mass and more preferably 0 to 10% by mass.

Incidentally, the content of the component, which has a particle diameter of 38 μm or less, can be measured by the following method.

After 10 mg of zeolite powder is mixed with 2 g of a sample, the particle size distribution is measured using a continuous sonic sieving measurement instrument (model name "Robot Sifter RPS-95" manufactured by SEISHIN ENTERPRISE CO., LTD.). At this time, a total of eight meshes of #20, #32, #42, #60, #100, #150, #250, and #400 are used, and a component passing through a mesh of #400 is designated as the component having a particle diameter of 38 μm or less.

As the method of reducing the content of the component, which has a particle diameter of 38 μm or less, contained in the vinyl polymer powder containing a vinyl polymer having a glass transition temperature of 0° C. or higher (provided that, when there are a plurality of glass transition points, all of the glass transition temperatures are 0° C. or higher), for example, there are mentioned a method in which a slurry having a pH of 6 or less by coagulating a latex of a polymer obtained by subjecting a vinyl monomer to emulsion polymerization in the presence of a non-ionic/anionic emulsifier is prepared and the precipitated vinyl polymer is recovered as a powder, and a method in which a vinyl polymer powder is sieved to remove the component having a particle diameter of 38 μm or less. Of these methods, from the viewpoint of having excellent industrial productivity, it is preferable to employ a method in which a slurry having a pH of 6 or less by coagulating a latex of a polymer obtained by subjecting a vinyl monomer to emulsion polymerization in the presence of a non-ionic/anionic emulsifier is prepared and the precipitated vinyl polymer is recovered as a powder.

[Mass Average Molecular Weight]

The mass average molecular weight of the vinyl polymer in the first embodiment of the invention is preferably 5,000 to 20,000,000.

When the vinyl polymer powder is blended, as a flowability improver, in an engineering plastic, if the mass average molecular weight of the vinyl polymer is 5,000 or more, mechanical properties are difficult to impair, and if the mass average molecular weight is 20,000,000 or less, excellent melt flowability is achieved. From the above point of view, the mass average molecular weight of the vinyl polymer is preferably 5,000 to 200,000, more preferably 10,000 to 150,000, still more preferably 15,000 to 100,000, particularly preferably 20,000 to 100,000, and most preferably 30,000 to 75,000.

In addition, when the vinyl polymer powder is blended, as a melt tension improver, in an engineering plastic, if the mass average molecular weight of the vinyl polymer is 200,000 or more, excellent melt tension is achieved, and if the mass average molecular weight is 20,000,000 or less, the engineering plastic and the vinyl polymer are easily melted and kneaded. From the above point of view, the mass average molecular weight of the vinyl polymer is preferably 200,000 to 20,000,000, more preferably 200,000 to 10,000,000, and still more preferably 500,000 to 5,000,000.

Incidentally, the mass average molecular weight can be measured by gel permeation chromatography in terms of polystyrene.

[Polymerization]

The vinyl polymer powder in the first embodiment of the invention is produced by, for example, polymerizing a vinyl monomer capable of radical polymerization, and then recovering the latex of the obtained vinyl polymer as a powder.

As the polymerization method for the vinyl polymer, in terms of easily controlling the composition distribution of the polymer and the particle morphology, emulsion polymerization, miniemulsion polymerization, or fine suspension polymerization is preferable, and emulsion polymerization is more preferable.

The polymerization method is not particularly limited, and one-step polymerization, two-step polymerization, multi-stage polymerization, or the like can be employed. For example, the vinyl monomer is divided into a first vinyl monomer and a second vinyl monomer. First, the first vinyl monomer is subjected to emulsion polymerization to obtain a pre-copolymer, and then the first vinyl monomer may be subjected to emulsion polymerization in the presence of the pre-copolymer.

[Vinyl Monomer]

In the invention, the vinyl polymer can be obtained by polymerizing a vinyl monomer.

In any of a case where the vinyl polymer powder is used as a flowability improver and a case where the vinyl polymer powder is used as a melt tension improver, the vinyl polymer preferably contains a (meth)acrylate ester unit which contains an alkyl group having 1 to 4 carbon atoms or an aromatic group in an ester moiety, from the viewpoint of dispersibility of the vinyl polymer powder, which is obtainable, in an engineering plastic, particularly, polyester and polycarbonate. Incidentally, in the present specification, the term "(meth)acrylic acid" refers to either or both of an acrylic acid in which a hydrogen atom is bonded at the α-position and a methacrylic acid in which a methyl group is bonded at the α-position. The term "(meth)acrylic acid ester" refers to either or both of an acrylic acid ester in which a hydrogen atom is bonded at the α-position and a methacrylic acid ester in which a methyl group is bonded at the α-position. The term "(meth)acrylate" refers to either or both of an acrylate in which a hydrogen atom is bonded at the α-position and a methacrylate in which a methyl group is bonded at the α-position.

As a monomer that is a raw material of the (meth)acrylate ester unit, which contains an alkyl group having 1 to 4 carbon atoms in an ester moiety, for example, the following examples are mentioned. Examples thereof include methyl (meth)acrylate, ethyl (meth)acrylate, propyl (meth)acrylate, and butyl (meth)acrylate. The alkyl group may be linear or branched. These monomers may be used singly or in combination of two or more kinds thereof. Among these, from the viewpoint of dispersibility of the vinyl polymer powder, which is obtainable, in an engineering plastic, particularly, polyester and polycarbonate, as the alkyl group of the ester moiety, it is preferable to have an alkyl group having 1 to 2 carbon atoms (methyl group or ethyl group) and more preferable to have an alkyl group having one carbon atom (methyl group). In addition, from the viewpoint of easily increasing the glass transition temperature of the vinyl polymer, which is obtainable, a methacrylic acid ester is preferably used.

As a (meth)acrylic acid ester having an aromatic group in an ester moiety, for example, the following examples are mentioned. Examples thereof include phenyl (meth)acrylate, 4-t-butylphenyl (meth)acrylate, bromophenyl (meth)acrylate, dibromophenyl (meth)acrylate, 2,4,6-tribromophenyl (meth)acrylate, monochlorophenyl (meth)acrylate, dichlorophenyl (meth)acrylate, trichlorophenyl (meth)acrylate, benzyl (meth)acrylate, and naphthyl (meth)acrylate. Among these, from the viewpoint of dispersibility of the vinyl polymer powder, which is obtainable, in an engineering plastic, particularly, polyester and polycarbonate, phenyl (meth)acrylate, benzyl (meth)acrylate, or naphthyl (meth)acrylate is preferable, and phenyl (meth)acrylate or naphthyl (meth)acrylate is more preferable. In addition, from the viewpoint of easily increasing the glass transition temperature of the vinyl polymer, which is obtainable, a methacrylic acid ester is preferably used. Among these, from the viewpoint of dispersibility of the vinyl polymer powder, which is obtainable, in an engineering plastic, particularly, polyester and polycarbonate, the number of carbon atoms that constitute an aromatic ring contained in the aromatic group of the ester moiety is preferably 6 to 10.

When the vinyl polymer powder is used as a flowability improver, the content of the (meth)acrylate ester unit containing an alkyl group having 1 to 4 carbon atoms or an aromatic group in an ester moiety is preferably 0.5 to 99.5% by mass, more preferably 5 to 70% by mass, and still more preferably 10 to 50% by mass in the total mass of the entire monomer unit that constitutes the vinyl polymer. When the content of the (meth)acrylate ester unit containing an alkyl group having 1 to 4 carbon atoms or an aromatic group in an ester moiety is 0.5% by mass or more, the vinyl polymer powder, which is obtainable, is excellent in dispersibility in an engineering plastic, particularly, polyester and polycarbonate, and as a result, a molded body, which is obtainable, is excellent in appearance. In addition, when the content thereof is 99.5% by mass or less, excellent melt flowability is achieved.

When the vinyl polymer powder is used as a melt tension improver, the content of the (meth)acrylate ester unit containing an alkyl group having 1 to 4 carbon atoms or an aromatic group in an ester moiety is preferably 0.5 to 100% by mass and more preferably 50 to 100% by mass in the total mass of the entire monomer unit that constitutes the vinyl polymer. When the content of the (meth)acrylate ester unit containing an alkyl group having 1 to 4 carbon atoms or an aromatic group in an ester moiety is 0.5% by mass or more, the vinyl polymer powder, which is obtainable, is excellent in dispersibility in an engineering plastic, particularly, polyester and polycarbonate, and as a result, excellent melt tension improvement effect and excellent appearance of a molded body are achieved.

When the vinyl polymer powder is used as a flowability improver, the vinyl polymer preferably contains an aromatic vinyl monomer unit.

As a monomer that is a raw material of the aromatic vinyl monomer unit, for example, the following examples are mentioned. Examples thereof include styrene, α-methyl styrene, p-methyl styrene, p-t-butyl styrene, p-methoxy styrene, o-methoxy styrene, 2,4-dimethyl styrene, chlorostyrene, bromostyrene, vinyltoluene, vinylnaphthalene, vinylanthracene, and divinylbenzene. These monomers may be used singly or in combination of two or more kinds thereof. Among these, from the viewpoint of easily increase the polymerization rate of the vinyl polymer and the glass transition temperature, styrene, α-methyl styrene, p-methyl styrene, or p-t-butyl styrene is preferable, and styrene or α-methyl styrene is more preferable.

When the vinyl polymer powder is used as a flowability improver, the content of the aromatic vinyl monomer unit is preferably 0.5 to 99.5% by mass, more preferably 30 to 95% by mass, and still more preferably 50 to 90% by mass in the total mass of the entire monomer unit that constitutes the vinyl polymer. When the content of the aromatic vinyl monomer unit is 0.5% by mass or more, a resin composition obtained by blending the vinyl polymer powder, which is obtainable, in an engineering plastic, particularly, polyester and polycarbonate, is excellent in melt flowability, and when the content thereof is 99.5% by mass or less, a molded body, which is obtainable, is excellent in appearance.

When the vinyl polymer powder is used as a melt tension improver, the content of the aromatic vinyl monomer unit is preferably 0 to 99.5% by mass and more preferably 0 to 50% by mass in the total mass of the entire monomer unit that constitutes the vinyl polymer. The content thereof is still more preferably more than 0% by mass but 99.5% by mass or less and particularly preferably more than 0% by mass but 50% by mass or less. When the content of the aromatic vinyl monomer unit is more than 0%, excellent thermal stability at the time of molding process when the vinyl polymer powder, which is obtainable, is blended in an engineering plastic is achieved. In addition, when the content thereof is 99.5% by mass or less, excellent dispersibility in an engineering plastic, particularly, polyester and polycarbonate, is achieved, and as a result, excellent melt tension improvement effect and excellent appearance of a molded body are achieved.

[Other Components]

The vinyl polymer may contain other monomer units, as necessary.

A monomer that is a raw material of other monomer components is not particularly limited as long as it is a vinyl monomer capable of radical polymerization, and for example, the following examples are mentioned. Examples thereof include a (meth)acrylic acid ester, which has an alkyl group not having 1 to 4 carbon atoms in an ester moiety, such as n-hexyl (meth)acrylate, cyclohexyl (meth)acrylate, n-octyl (meth)acrylate, 2-ethylhexyl (meth)acrylate, dodecyl (meth)acrylate, stearyl (meth)acrylate, or isobornyl (meth)acrylate; a carboxyl group-containing monomer such as (meth)acrylic acid or carboxyethyl (meth)acrylate; a hydroxyl group-containing monomer such as 2-hydroxyethyl (meth)acrylate or hydroxypropyl (meth)acrylate; a vinyl cyanide monomer such as (meth)acrylonitrile; a vinyl ether monomer such as vinyl methyl ether or vinyl ethyl ether; a vinyl carboxylate monomer such as vinyl benzoate, vinyl acetate, or vinyl butyrate; a (meth)acrylate having a reactive functional group such as glycidyl (meth)acrylate, allyl (meth)acrylate, 1,3-butylene di(meth)acrylate, ethylene glycol di(meth)acrylate, or polybutylene glycol di(meth) acrylate; and an olefin such as ethylene, propylene, or butylene. These other monomers may be used singly or in combination of two or more kinds thereof.

In the case of using other monomers, the content of the other monomer unit is preferably 0 to 20% by mass in the total mass of the entire monomer unit that constitutes the vinyl polymer. When the content of the other monomer unit is 0 to 20% by mass, the vinyl polymer powder, which is obtainable, is less likely to inhibit the object of the invention.

The vinyl monomer is preferably a combination of styrene and phenyl methacrylate; a combination of styrene, α-methyl styrene, phenyl methacrylate, methyl methacrylate, and allyl methacrylate; a combination of styrene, α-methyl styrene, methyl methacrylate, and allyl methacrylate; a combination of styrene, α-methyl styrene, phenyl methacrylate, methyl methacrylate, n-butyl acrylate, and allyl methacrylate; and a combination of methyl methacrylate and n-butyl acrylate.

In addition, when the polymerization reaction is two-step polymerization, the first vinyl monomer is preferably a combination of styrene, α-methyl styrene, and phenyl methacrylate; and a combination of styrene, α-methyl styrene, and methyl methacrylate.

The second vinyl monomer is preferably a combination of styrene, phenyl methacrylate, methyl methacrylate, and allyl methacrylate; a combination of styrene, methyl methacrylate, and allyl methacrylate; and a combination of styrene, phenyl methacrylate, methyl methacrylate, n-butyl acrylate, and allyl methacrylate.

A polymerization initiator to be used in polymerization of the vinyl monomer is not particularly limited, and a known polymerization initiator can be used. Examples thereof include a persulfate, an organic peroxide, an azo initiator, a redox-based initiator as a combination of a persulfate and a reducing agent, and a redox-based initiator as a combination of an organic peroxide and a reducing agent. These polymerization initiators may be used singly or in combination of two or more kinds thereof. In addition, a method for adding a polymerization initiator to a reaction vessel is not particularly limited, and the polymerization initiator may be added all at once or separately.

In polymerization for obtaining the vinyl polymer in the first embodiment of the invention, as necessary, a chain transfer agent may be used.

Examples of the chain transfer agent include mercaptans such as n-dodecyl mercaptan, t-dodecyl mercaptan, n-octyl mercaptan, t-octyl mercaptan, n-tetradecyl mercaptan, n-hexyl mercaptan, and n-butyl mercaptan; halogen compounds such as carbon tetrachloride and ethylene bromide; and α-styrene dimer. These chain transfer agents may be used singly or in combination of two or more kinds thereof.

[Emulsifier]

Examples of an emulsifier to be used in emulsion polymerization of the vinyl monomer include anionic emulsifiers, non-ionic emulsifiers, non-ionic/anionic emulsifiers, and polymeric emulsifiers. Among these, non-ionic/anionic emulsifiers are preferably used. Incidentally, in the invention, the term "non-ionic/anionic emulsifier" refers to an emulsifier having a non-ionic hydrophilic moiety and an anionic hydrophilic moiety (ionic hydrophilic moiety) in the same molecule.

When the latex containing the vinyl polymer is coagulated, a trace amount of the emulsifier remains, as an acid or a salt, in the vinyl polymer powder, and there is a concern that, when the vinyl polymer powder is blended in an engineering plastic, particularly, polyester and polycarbonate, the resin is decomposed. When a large amount of the emulsifier remains, as an acid, in the vinyl polymer powder, the acid value of the vinyl polymer powder is increased. When a large amount of the emulsifier remains, as a salt, in the vinyl polymer powder, metal ions in the vinyl polymer powder are increased. Since the non-ionic/anionic emulsifier can maintain water solubility to some extent by the non-ionic hydrophilic moiety even when hydrophilicity of the anionic hydrophilic moiety is decreased by coagulation of the vinyl polymer latex, the non-ionic/anionic emulsifier is easily washed at the time of coagulation and is less likely to remain in the vinyl polymer powder.

Further, the latex obtained by polymerizing the vinyl monomer in the presence of the non-ionic/anionic emulsifier is easily coagulated and easily enhances the bulk density and the free flow property of the powder, which is preferable.

The anionic hydrophilic moiety (ionic hydrophilic moiety) of the non-ionic/anionic emulsifier is preferably phosphoric acid (phosphoric acid group) or a salt thereof, or carboxylic acid (carboxyl group) or a salt thereof, from the viewpoint of easily decreasing the acid value of the vinyl polymer powder, which is obtainable.

Examples of the non-ionic/anionic emulsifier of which the anionic hydrophilic moiety is carboxylic acid or a salt thereof include polyoxyethylene alkyl ether acetate. Herein, the number of carbon atoms of the alkyl group is preferably 4 to 20 and more preferably 8 to 20. The average addition molar number of ethylene oxide is preferably 1 to 12 and more preferably 3 to 12. These emulsifiers may be used in an acid form or in a salt form of sodium salt or potassium salt. Specifically, sodium polyoxyethylene (4.5) lauryl ether acetate is mentioned. Incidentally, in a case where the term "polyoxyethylene (X)" is described in the present specification, X refers to the average addition molar number of ethylene oxide.

Examples of the non-ionic/anionic emulsifier of which the anionic hydrophilic moiety is phosphoric acid or a salt thereof include polyoxyethylene phenyl ether phosphate, polyoxyethylene alkyl phenyl ether phosphate, and polyoxyethylene alkyl ether phosphate. Herein, the number of carbon atoms of the alkyl group is preferably 4 to 20 and more preferably 8 to 20. The average addition molar number of ethylene oxide is preferably 1 to 12 and more preferably 3 to 12. These emulsifiers may be used in an acid form or in a salt form of sodium salt or potassium salt. Specifically, sodium polyoxyethylene (6) alkyl ether phosphate is mentioned.

Examples of the non-ionic/anionic emulsifier of which the anionic hydrophilic moiety is phosphoric acid or a salt thereof, or carboxylic acid or a salt thereof include polyoxyethylene alkyl ether sulfate.

Examples of the anionic emulsifier include sulfonates such as sodium dodecylsulfonate, sodium dodecylbenzenesulfonate, and sodium dialkyl sulfosuccinate; fatty acid salts such as potassium oleate and sodium stearate; and alkyl phosphate salts.

Examples of the non-ionic emulsifier include polyoxyalkylene alkyl ether, polyoxyethylene alkylene alkyl ether, polyoxyethylene distyrenated phenyl ether, polyoxyethylene tribenzyl phenyl ether, sorbitan fatty acid ester, polyoxyethylene sorbitan fatty acid ester, and polyoxyethylene fatty acid ester.

Examples of the polymeric emulsifier include polymer carbonates.

The emulsifiers described above may be used singly or in combination of two or more kinds thereof.

The used amount of the emulsifier is not particularly limited, but the used amount is preferably 0.1 to 20 parts by mass, more preferably 0.1 to 10 parts by mass, and still more preferably 0.1 to 5 parts by mass with respect to 100 parts by mass of the vinyl monomer. When the used amount of the emulsifier is 0.1 part by mass or more, excellent emulsion stability is achieved, and when the used amount is 20 parts by mass or less, coagulation is easily performed.

[Powder Recovery]

The vinyl polymer powder in the first embodiment of the invention is obtained by, for example, recovering a vinyl polymer latex as a powder.

As the method of powdering the vinyl polymer latex, a known powdering method can be used. For example, a coagulation method and a spray drying method are mentioned. Of these methods, as compared to the spray drying method, the coagulation method is preferable since the emulsifier is less likely to remain in the vinyl polymer powder.

As the coagulation method of the vinyl polymer latex of the invention, for example, a method is mentioned in which the latex is brought in contact with a hot water in which a coagulation agent is dissolved, a slurry is formed by coagulation under stirring, and then the generated precipitate is dehydrated and dried. Examples of the coagulation agent include acids and salts. The temperature of the hot water is preferably (the glass transition temperature of the vinyl polymer −25° C.) to (the glass transition temperature of the vinyl polymer +25° C.). When the temperature of the hot water is (the glass transition temperature of the vinyl polymer −25° C.) or higher, fine powder in the vinyl polymer powder is less likely to increase. When the temperature of the hot water is (the glass transition temperature of the vinyl polymer +25° C.) or lower, coarse particles excessively fused with vinyl polymer particles are less likely to be generated.

At this time, when the coagulation agent is a calcium salt, a magnesium salt, an aluminum salt, a barium salt, or a zinc salt, the coagulation agent forms a hardly soluble salt along with the emulsifier, and a salt derived from the coagulation agent easily remains in the vinyl polymer powder. As a result, since the decomposition of the resin is easily promoted when the obtained vinyl polymer powder is blended in an engineering plastic, particularly, polyester and polycarbonate, it is not preferable that the coagulation agent is salts described above. In addition, when the coagulation agent is a calcium salt, a magnesium salt, an aluminum salt, a barium salt, or a zinc salt, coagulation force is weak and the powder property of the obtained vinyl polymer powder is easily decreased. Therefore, as the coagulation agent, acids are preferably used. Examples of the acid used for the coagulation agent include inorganic acids such as sulfuric acid, hydrochloric acid, hydrofluoric acid, phosphoric acid, and nitric acid; and organic acids such as acid, acetic acid, and benzenesulfonate. Among them, in terms of having strong acidity, sulfuric acid and hydrochloric acid are preferable.

The used amount of the coagulation agent is not particularly limited as long as it is the used amount that can sufficiently induce coagulation from a latex, but the used amount is preferably 0.1 to 20 parts by mass, more preferably 0.1 to 10 parts by mass, and still more preferably 0.1 to 5 parts by mass with respect to 100 parts by mass of the resin solid content (100 parts by mass of the vinyl polymer) in the vinyl polymer latex. When the used amount of the coagulation agent is 0.1 part by mass or more, the powder recovery property of the vinyl polymer is favorable. When the used amount of the coagulation agent is 20 parts by mass or less, thermal stability at the time of high-temperature molding a resin composition blended in an engineering plastic, particularly, polyester and polycarbonate, is excellent.

The pH of the slurry obtained by coagulating the vinyl polymer latex is preferably 6 or less, more preferably 4 or less, and still more preferably 1 to 4. When the pH of the slurry is 6 or less, the anionic hydrophilic moiety of the emulsifier is less likely to be in the state of a metal salt, and the metal salt of the emulsifier is less likely to remain in the vinyl polymer powder, which is obtainable. As a result, when the vinyl polymer powder is blended in an engineering plastic, particularly, polyester and polycarbonate, the decomposition of the resin is less likely to promote.

The pH of the slurry may be adjusted by the type or amount of the coagulation agent, or may be adjusted by adding an acid or a salt to the coagulated slurry.

After obtaining the slurry, solidification may be performed. The solidification is a step of reducing voids of the precipitated particles so that fracturing is less likely to occur. The temperature at the time of solidification is preferably higher than the coagulation temperature to (the coagulation temperature +40° C.) since the fine powder in the vinyl polymer powder is less likely to increase.

After the vinyl polymer powder is separated from the slurry, washing with ion-exchanged water or the like, dehydrating, and drying may be performed. By performing washing, the amount of impurities can be controlled.

[Thermoplastic Resin Composition]

A thermoplastic resin composition in a second embodiment of the invention contains the vinyl polymer in the first embodiment of the invention and an engineering plastic. The engineering plastic used in the thermoplastic resin composition in the second embodiment of the invention is not particularly limited, but a known engineering plastic can be used. As the engineering plastic, for example, the following examples are mentioned. Examples thereof include polyesters such as polyethylene terephthalate and polybutylene terephthalate; polyamides such as 6-nylon, 6,6-nylon, and polyphenylene terephthalamide; polycarbonate, syndiotactic polystyrene, polyarylate, polyphenylene ether, polyphenylene sulfide, polyether ketone, polyether ether ketone, polysulfone, polyethersulfone, polyamide-imide, polyetherimide, and polyacetal. Among these, from the viewpoint of having high improvement effect of molding processability, polyamide, polyester, or polycarbonate is preferable, polyester or polycarbonate is more preferable, and polycarbonate is still more preferable.

A commercially available or synthetic engineering plastic may be used. Examples of the commercially available product include an aromatic polycarbonate resin (product name: "lupilon S-2000F", manufactured by Mitsubishi Engineering-Plastics Corporation, viscosity average molecular weight: 22,000) and an aromatic polycarbonate resin (product name: "lupilon S-3000F", manufactured by Mitsubishi Engineering-Plastics Corporation, viscosity average molecular weight: 21,000).

In the thermoplastic resin composition in the second embodiment of the invention, the following resins can be blended in the range that does not impair excellent heat resistance, impact resistance, flame retardance, or the like inherent to the engineering plastic, specifically, in a range of 40% by mass or less with respect to 100% by mass of the resin composition. Examples of the resins include a styrene-based resin such as ABS, HIPS, PS, or PAS; an acrylic resin such as polymethyl methacrylate; and a polyolefin-based resin such as polyethylene or polypropylene. Specifically, the content of the resin is preferably 0 to 40% by mass and more preferably 0 to 30% by mass with respect to 100% by mass of the resin composition.

The blending ratio of the vinyl polymer powder and the engineering plastic in the first embodiment of the invention may be appropriately determined depending on desired physical properties or the like and is not particularly limited; however, in order to obtain the improvement effect of effective molding processability without a decrease in excellent properties (mechanical properties, heat resistance, and the like) of the engineering plastic, the vinyl polymer powder is blended in preferably 0.1 to 30% by mass, more preferably 1 to 20% by mass, and still more preferably 1 to 15% by mass with respect to 100% by mass of the resin composition. When the blended amount of the vinyl polymer powder is 0.1% by mass or more, sufficient improvement effect of molding processability is obtained. In addition, when the blended amount of the vinyl polymer powder is 30% by mass or less, the mechanical properties of the engineering plastic are less likely to be impaired.

The engineering plastic is blended in preferably 70 to 99.9% by mass, more preferably 80 to 99% by mass, and still more preferably 85 to 99% by mass with respect to 100% by mass of the resin composition.

Moreover, as necessary, a known additive can be blended in the thermoplastic resin composition in the second embodiment of the invention in order to provide various functions to the molded body or improve characteristics of the molded body. Examples of such an additive include an antioxidant, a UV absorbent, a light stabilizer, a mold-release agent, a lubricant, a slip agent, a colorant (a pigment such as carbon black or titanium oxide, or a dye), a fluorescent whitening agent, a light-storing pigment, a fluorescent dye, and an antistatic agent. Further, in order to increase the strength and the rigidity of the molded body and to increase flame retardance, the molded body can contain a filler material such as talc, mica, calcium carbonate, glass fiber, carbon fiber, or potassium titanate fiber. Moreover, in order to improve impact resistance, a rubber-like elastomer formed from a core-shell two-layer structure can be blended.

As a preferred combination of the vinyl polymer powder and the engineering plastic, it is preferable to use a combination of polycarbonate and at least one vinyl polymer powder selected from the group consisting of a vinyl polymer powder containing a unit derived from styrene and phenyl methacrylate; a vinyl polymer powder containing a unit derived from styrene, α-methyl styrene, phenyl methacrylate, methyl methacrylate, and allyl methacrylate; a vinyl polymer powder containing a unit derived from styrene, α-methyl styrene, methyl methacrylate, and allyl methacrylate; a vinyl polymer powder containing a unit derived from styrene, α-methyl styrene, phenyl methacrylate, methyl methacrylate, n-butyl acrylate, and allyl methacrylate; and a vinyl polymer powder containing a unit derived from methyl methacrylate and n-butyl acrylate.

The resin composition containing the vinyl polymer powder in the first embodiment of the invention and an engineering plastic is prepared as a powder mixture or a melt-kneaded product. At this time, for example, a Henschel mixer, a Banbury mixer, a single-screw extruder, a twin-screw extruder, a double-roller mill, a kneader, a Brabender, or the like is used. In addition, a master batch in which a vinyl polymer powder having a large content ratio of the vinyl polymer powder and the engineering plastic are mixed is prepared in advance, and then the master batch and the engineering plastic again are mixed so that a resin composition having a desired composition can be also obtained. The temperature of the mixing and/or kneading is not particularly limited, but is appropriately selected and determined usually within a range of 240 to 350° C.

[Molded Body]

A molded body in a third embodiment of the invention is obtained by molding the above-described thermoplastic resin composition. Examples of the molding method include compression molding, transfer molding, injection molding, blow molding, extrusion molding, laminate molding, and calendar molding. The molding temperature of the resin composition (the temperature of the resin composition) is not particularly limited. As the molding temperature is higher, the resin composition is excellent in melt flowability. However, when the molding temperature is too high, the decomposition of the resin composition is promoted. Thus, the molding temperature is preferably 240 to 350° C.

The molded body in the third embodiment of the invention can be used in representative fields such as the OA equipment field, the electrical/electronic equipment field, and the building material field, and in a wide range of other fields.

EXAMPLES

Hereinafter, the invention will be described by means of Examples. First, before describing Examples, evaluation methods of Examples of a vinyl polymer powder and a resin composition will be described. Incidentally, in the following description, the term "parts" means "parts by mass" and "%" means "% by mass, unless otherwise specified. In addition, all of vinyl polymer powders of Examples were allowed to pass through a sieve having a mesh size of 2.4 mm to remove coarse powder and were used for each evaluation.

[Mass Average Molecular Weight (Mw) and Number Average Molecular Weight (Mn)]

The mass average molecular weight (Mw) and the number average molecular weight (Mn) of the vinyl polymer were measured using gel permeation chromatography under the following conditions.
Apparatus: HLC8220 manufactured by Tosoh Corporation
Column: TSKgel SuperMultipore HZ-H (inner diameter 4.6 mm×length 15 cm×2 columns) manufactured by Tosoh Corporation
Temperature: 40° C.
Carrier liquid: tetrahydrofuran
Flow rate: 0.35 ml/min
Sample concentration: 0.1%
Sample injection amount: 10 μl
Standard: polystyrene

[Glass Transition Temperature]

The glass transition temperature of the vinyl polymer was measured using a differential scanning calorimeter (DSC) (model name "DSC6200" manufactured by Seiko Instruments Inc.) according to JIS K7121. The numerical value of the extrapolated glass transition initiating temperature was used as the glass transition temperature.

[Acid Value]

A vinyl polymer powder sample was added to toluene, and the resultant mixture was stirred at room temperature and completely dissolved. After the mixture was dissolved, 40 ml of a mixed solution of toluene/ethanol=50/50% by volume was added thereto to dilute the mixture. The obtained vinyl polymer solution was titrated with an ethanolic potassium hydroxide solution to pH 12. In Table 1, the dissolution condition of the vinyl polymer powder sample and the concentration of the ethanolic potassium hydroxide solution used for titration were collectively presented.

TABLE 1

| | Sample weight (g) | Toluene weight (g) | Ethanolic potassium hydroxide solution concentration (mol/l) |
|---|---|---|---|
| Examples 1 to 9 Comparative Examples 1 to 4 | 10 | 30 | 0.5 |
| Examples 10 to 12 | 1 | 50 | 0.01 |

[Quantitative Determination of Metal Ions]

1 g of a sample was measured in a platinum dish, subjected to dry incineration using an electric heater, and dissolved with hydrochloric acid and distilled water, and the resultant solution was diluted to 50 ml by distilled water to serve as a test solution. To this test solution, an ICP emission spectrometer (model name "IRIS Interpid II XSP" manufactured by Thermo Fisher Scientific Inc.) was used to quantify the amount of metal ions.

[Evaluation of Powder Property of Vinyl Polymer Powder]

(1) Bulk Density

After 0.1 g of zeolite powder was mixed with about 120 $cm^3$ of the vinyl polymer powder, the bulk density was measured according to JIS K6720. As the bulk density is higher, excellent powder handling property is achieved.

(2) Free Flow Property

FIG. 1 illustrates a measurement instrument used for evaluation of free flow property. This measurement instrument includes a seat 41 on which a tray 40 is set, a funnel 43 provided with a shutter 42 at the cylindrical opening thereof, a support 44 holding the funnel 43 above the seat 41, and a support rod 45 to which the support 44 is fixed. The evaluation of free flow property using this measurement instrument was carried out as follows.

First, the measurement instrument was placed in a horizontal site, the shutter 42 of the funnel 43 was closed, and 120 $cm^3$ of powder was uniformly put into the funnel 43. Subsequently, the shutter was opened to drop the powder, and immediately, the tray 40 in which the tare had been measured in advance was set on the seat 41. At the same time of setting the tray 40, the counting of time started by using a stopwatch, and after 10 seconds, the tray 40 was removed from the measurement instrument. The tray containing the powder was weighed to obtain the amount of the powder dropped for 10 seconds. The above measurement was carried out two times, and an average value of the amounts of the powder dropped for 10 seconds was obtained and this value was designated as the free flow property (g/10 sec). As the free flow property is higher, excellent powder flowability is achieved.

[Evaluation of Thermal Stability of Resin Composition]

A pellet of a polycarbonate resin composition was used as the resin composition.

This evaluation is evaluation of thermal stability of the resin composition that is performed with the yellowness index (YI) value of a flat plate made from the resin composition, and it is determined that the resin composition in which ΔYI defined by the following equation is small is excellent in thermal stability.

$$\Delta YI = YI \text{ after retention} - \text{Initial } YI$$

(1) Initial YI

The pellet was supplied to a 100 t injection molding machine (model name "SE-100DU", manufactured by Sumitomo Heavy Industries, Ltd.) having a cylinder temperature set to 320° C., and a flat plate having a length of 100 mm, a width of 50 mm, and a thickness of 2 mm was obtained by injection molding. Then, the YI value of the flat plate was measured and this value was designated as the initial YI.

(2) YI after Retention

The pellet was supplied to a 100 t injection molding machine (model name "SE-100DU", manufactured by Sumitomo Heavy Industries, Ltd.) having a cylinder temperature set to 320° C., and a flat plate having a length of 100 mm, a width of 50 mm, and a thickness of 2 mm was obtained by injection molding after the pellet was retained in the cylinder for 30 minutes. Then, the YI value of the flat plate was measured and this value was designated as the YI after retention.

The YI value of flat plate was measured under the conditions of a C-light source and a viewing angle of 2° with a light-splitting colorimeter (model name "SE2000" manufactured by NIPPON DENSHOKU INDUSTRIES CO., LTD.) according to JIS K7105 by a transmitted-light measurement method in the case of Examples 13 to 22 and Comparative Examples 5 to 8 and by a reflected-light measurement method in the case of Examples 23 to 25.

[Melt Flowability]

The melt flowability was evaluated by a spiral flow length of the resin composition and measured by using an injection molding machine (model name "SE-100DU", manufactured by Sumitomo Heavy Industries, Ltd.). When the spiral flow length is longer, excellent melt flowability is achieved. Incidentally, as the molding conditions, a molding temperature was set to 320° C., a mold temperature was set to 80° C., a thickness of a molded body to be obtained was set to 2 mm, and a width thereof was set to 15 mm.

[Melt Tension]

The melt tension was measured in such a manner that a pellet of the resin composition was extruded in a constant amount (1.57 cm$^3$/min) by using a capillary rheometer (model name "Twin capillary rheometer Model RH-7", manufactured by ROSAND) under the conditions of a die diameter=φ 1 mm, L/D=16, and a temperature of 280° C., and a strand was drawn out at a constant rate (10 m/min).

Examples 1 to 12 and Comparative Examples 1 to 4

Example 1

A separable flask (volume: 5 liters) equipped with a stirring blade, a condenser, a thermocouple, and a nitrogen inlet was charged with 1.0 part of sodium polyoxyethylene (6) alkyl ether phosphate as an emulsifier and 294 parts of ion-exchanged water, and then the components were stirred under nitrogen gas flow at room temperature for 30 minutes. Incidentally, sodium polyoxyethylene (6) alkyl ether phosphate described above was used in the form of being dissolved in advance in a portion of the above ion-exchanged water.

Then, the temperature of the solution in the flask was increased to 60° C., and then a solution prepared by dissolving a mixture containing 0.0001 part of ferrous sulfate, 0.0003 part of disodium ethylene diaminetetraacetate, and 0.3 part of rongalite in 4 parts of ion-exchanged water was added to the flask. Further, a mixture containing 87.5 parts of styrene, 12.5 parts of phenyl methacrylate, 0.5 part of n-octyl mercaptan, and 0.2 part of t-butyl hydroperoxide was added dropwise to the flask over 4.5 hours to perform radical polymerization. After the completion of dropwise addition, the temperature of the solution in the flask was increased to 80° C., and then the mixture was stirred for 1 hour while the temperature of the solution was maintained at 80° C. to obtain a vinyl polymer latex. The content of the vinyl polymer in this latex was 25%.

Then, a reaction vessel (volume: 40 liters) equipped with a stirring apparatus was charged with 280 parts of sulfuric acid aqueous solution containing 2 parts of sulfuric acid as a coagulation agent, and then this aqueous solution was heated to a temperature of 90° C. Then, the latex was slowly added dropwise to this aqueous solution under stirring such that the polymer was coagulated to obtain a slurry. Then, after the temperature of this slurry was increased to 98° C., the slurry was stirred for 5 minutes to perform solidification. Incidentally, the pH of the solidified slurry was 1.5. Subsequently, the obtained precipitate was separated from the slurry, and then washing with 3000 parts of ion-exchanged water, dehydrating, and drying were performed to obtain 100 parts of vinyl polymer powder (A-1).

Example 2

A vinyl polymer latex was obtained by performing polymerization in the same manner as in Example 1, except that the emulsifier was changed to 1.0 part of sodium polyoxyethylene (4.5) lauryl ether acetate. Subsequently, 100 parts of vinyl polymer powder (A-2) was obtained by performing coagulation of the latex in the same manner as in Example 1, except that the coagulation agent was changed to 0.5 part of sulfuric acid. Incidentally, the pH of the solidified slurry at this time was 2.2.

Example 3

A separable flask (volume: 5 liters) equipped with a stirring blade, a condenser, a thermocouple, and a nitrogen inlet was charged with 2.0 parts of sodium polyoxyethylene (4.5) lauryl ether acetate as an emulsifier and 293 parts of ion-exchanged water, and then the components were stirred under nitrogen gas flow at room temperature for 30 minutes. Incidentally, sodium polyoxyethylene (4.5) lauryl ether acetate described above was used in the form of being dissolved in advance in a portion of the above ion-exchanged water.

Then, the temperature of the solution in the flask was increased to 60° C., and then a solution prepared by dissolving a mixture containing 0.0001 part of ferrous sulfate, 0.0003 part of disodium ethylene diaminetetraacetate, and 0.3 part of rongalite in 4 parts of ion-exchanged water was added to the flask. Further, a mixture containing 30 parts of styrene, 10 parts of α-methyl styrene, 10 parts of phenyl methacrylate, 0.23 part of n-octyl mercaptan, and 0.1 part of t-butyl hydroperoxide was added dropwise to the flask over 4 hours to perform first radical polymerization. After the completion of dropwise addition of the first mixture, the mixture was stirred for 1 hour while the temperature of the solution in the flask was maintained at 60° C., and then a mixture containing 20 parts of styrene, 14.88 parts of phenyl methacrylate, 14.88 parts of methyl methacrylate, 0.25 part of allyl methacrylate, 0.34 part of n-octyl mercaptan, and 0.1 part of t-butyl hydroperoxide was added dropwise to the flask over 4 hours to perform second radical polymerization. After the completion of dropwise addition of the second mixture, the temperature of the solution in the flask was increased to 80° C., and then the mixture was stirred for 1 hour while the temperature of the solution was maintained at 80° C. to obtain a vinyl polymer latex. The content of the vinyl polymer in this latex was 25%.

Subsequently, 100 parts of vinyl polymer powder (A-3) was obtained by performing coagulation of the latex in the same manner as in Example 2. Incidentally, the pH of the solidified slurry at this time was 2.0.

Example 4

A vinyl polymer latex was obtained by performing polymerization in the same manner as in Example 3, except that the emulsifier was changed to 1.0 part of sodium polyoxyethylene (4.5) lauryl ether acetate, the first mixture was changed to a mixture containing 30 parts of styrene, 10 parts of α-methyl styrene, 10 parts of methyl methacrylate, 0.23 part of n-octyl mercaptan, and 0.1 part of t-butyl hydroperoxide, and the second mixture was changed to a mixture containing 20 parts of styrene, 29.75 parts of methyl methacrylate, 0.25 part of allyl methacrylate, 0.34 part of n-octyl mercaptan, and 0.1 part of t-butyl hydroperoxide. Subsequently, 100 parts of vinyl polymer powder (A-4) was obtained by performing coagulation of the latex in the same manner as in Example 2. Incidentally, the pH of the solidified slurry at this time was 2.1.

Example 5

A vinyl polymer latex was obtained by performing polymerization in the same manner as in Example 3. Then, a reaction vessel (volume: 40 liters) equipped with a stirring apparatus was charged with 280 parts of sulfuric acid aqueous solution containing 0.5 part of sulfuric acid as a coagulation agent, and then this aqueous solution was heated to a temperature of 90° C. Then, the latex was slowly added dropwise to this aqueous solution under stirring such that the polymer was coagulated to obtain a slurry. Then, after the temperature of this slurry was increased to 90° C., the slurry was stirred for 5 minutes to perform solidification. Moreover, a 10% aqueous solution of sodium hydroxide was added to the solidified slurry until the pH reached 3.7. Subsequently, the obtained precipitate was separated from the slurry, and then washing with 3000 parts of ion-exchanged water, dehydrating, and drying were performed to obtain 100 parts of vinyl polymer powder (A-5).

Example 6

A vinyl polymer latex was obtained by performing polymerization in the same manner as in Example 2. Subsequently, 100 parts of vinyl polymer powder (A-6) was obtained in the same manner as in Example 5, except that a 10% aqueous solution of sodium hydroxide was added to the solidified slurry until the pH reached 5.8.

Example 7

A vinyl polymer latex was obtained by performing polymerization in the same manner as in Example 3, except that the second mixture was changed to a mixture containing 20 parts of styrene, 14.88 parts of phenyl methacrylate, 12.88 parts of methyl methacrylate, 2 parts of n-butyl acrylate, 0.25 part of allyl methacrylate, 0.34 part of n-octyl mercaptan, and 0.1 part of t-butyl hydroperoxide. Subsequently, 100 parts of vinyl polymer powder (A-7) was obtained by performing coagulation of the latex in the same manner as in Example 2. Incidentally, the pH of the solidified slurry at this time was 2.0.

Example 8

A vinyl polymer latex was obtained by performing polymerization in the same manner as in Example 3, except that the second mixture was changed to a mixture containing 18.4 parts of styrene, 13.69 parts of phenyl methacrylate, 13.69 parts of methyl methacrylate, 4 parts of n-butyl acrylate, 0.25 part of allyl methacrylate, 0.34 part of n-octyl mercaptan, and 0.1 part of t-butyl hydroperoxide. Subsequently, 100 parts of vinyl polymer powder (A-8) was obtained by performing coagulation of the latex in the same manner as in Example 2, except that the coagulation temperature was changed to 85° C. and the solidification temperature was changed to 95° C. Incidentally, the pH of the solidified slurry at this time was 2.0.

Example 9

A vinyl polymer latex was obtained by performing polymerization in the same manner as in Example 3, except that the second mixture was changed to a mixture containing 15.2 parts of styrene, 11.3 parts of phenyl methacrylate, 11.3 parts of methyl methacrylate, 12 parts of n-butyl acrylate, 0.25 part of allyl methacrylate, 0.34 part of n-octyl mercaptan, and 0.1 part of t-butyl hydroperoxide. Subsequently, 100 parts of vinyl polymer powder (A-9) was obtained by performing coagulation of the latex in the same manner as in Example 2, except that the coagulation temperature was changed to 65° C. and the solidification temperature was changed to 75° C. Incidentally, the pH of the solidified slurry at this time was 2.0.

Example 10

A separable flask (volume: 3 liters) equipped with a stirring blade, a condenser, a thermocouple, and a nitrogen inlet was charged with 1.0 part of sodium polyoxyethylene (4.5) lauryl ether acetate as an emulsifier, 48 parts of methyl methacrylate, 2 parts of n-butyl acrylate, 0.004 part of n-octyl mercaptan, and 223 parts of ion-exchanged water, and then the components were stirred under nitrogen gas flow at room temperature for 30 minutes. Incidentally, sodium polyoxyethylene (4.5) lauryl ether acetate described above was used in the form of being dissolved in advance in a portion of the above ion-exchanged water.

Then, the temperature of the solution in the flask was increased to 45° C., and then a solution prepared by dissolving 0.15 part of potassium persulfate in 6 parts of ion-exchanged water was added thereto to initiate radical polymerization. After the polymerization and heat generation, a mixture containing 44 parts of methyl methacrylate and 6 parts of n-butyl acrylate was added dropwise to the flask over 2 hours while the temperature of the solution was maintained at 70° C. to perform radical polymerization. After the completion of dropwise addition, the mixture was stirred for 1 hour while the temperature of the solution was maintained at 70° C. to obtain a vinyl polymer latex. The content of the vinyl polymer in this latex was 30%.

Then, a reaction vessel (volume: 20 liters) equipped with a stirring apparatus was charged with 234 parts of sulfuric acid aqueous solution containing 0.5 part of sulfuric acid as a coagulation agent, and then this aqueous solution was heated to a temperature of 90° C. Then, the latex was slowly added dropwise to this aqueous solution under stirring such that the polymer was coagulated to obtain a slurry. Then, after the temperature of this slurry was increased to 98° C., the slurry was stirred for 5 minutes to perform solidification.

Incidentally, the pH of the solidified slurry was 2.0. Subsequently, the obtained precipitate was separated from the slurry, and then washing with 3000 parts of ion-exchanged water, dehydrating, and drying were performed to obtain 100 parts of vinyl polymer powder (A-10).

Example 11

A separable flask (volume: 3 liters) equipped with a stirring blade, a condenser, a thermocouple, and a nitrogen inlet was charged with 1.0 part of sodium polyoxyethylene (4.5) lauryl ether acetate as an emulsifier, 85 parts of methyl methacrylate, 15 parts of n-butyl acrylate, and 223 parts of ion-exchanged water, and then the components were stirred under nitrogen gas flow at room temperature for 30 minutes. Incidentally, sodium polyoxyethylene (4.5) lauryl ether acetate described above was used in the form of being dissolved in advance in a portion of the above ion-exchanged water.

Then, the temperature of the solution in the flask was increased to 45° C., and then a solution prepared by dissolving 0.15 part of potassium persulfate in 6 parts of ion-exchanged water was added thereto to initiate radical polymerization. After the polymerization and heat generation, the mixture was stirred for 1 hour while the temperature of the solution was maintained at 70° C. to obtain a vinyl polymer latex. The content of the vinyl polymer in this latex was 30%.

Subsequently, 100 parts of vinyl polymer powder (A-11) was obtained by performing coagulation of the latex in the same manner as in Example 10. Incidentally, the pH of the solidified slurry at this time was 2.0.

Example 12

A vinyl polymer latex was obtained by performing polymerization in the same manner as in Example 11, except that the vinyl monomer mixture was changed to a mixture containing 85 parts of methyl methacrylate, 15 parts of n-butyl acrylate, and 0.03 part of n-octyl mercaptan.

Subsequently, a vinyl polymer powder (A-12) was obtained by performing coagulation of the latex in the same manner as in Example 10. Incidentally, the pH of the solidified slurry at this time was 2.0.

Comparative Example 1

A vinyl polymer latex was obtained by performing polymerization in the same manner as in Example 3. Subsequently, 100 parts of vinyl polymer powder (A-13) was obtained by performing coagulation of the latex in the same manner as in Example 3, except that the coagulation agent was changed to 5.0 parts of calcium acetate. Incidentally, the pH of the solidified slurry at this time was 6.5.

Comparative Example 2

A vinyl polymer latex was obtained by performing polymerization in the same manner as in Example 1, except that the emulsifier was changed to 1.0 part of dipotassium alkenylsuccinate. Subsequently, 100 parts of vinyl polymer powder (A-14) was obtained by performing coagulation of the latex in the same manner as in Example 2. Incidentally, the pH of the solidified slurry at this time was 2.3.

Comparative Example 3

A vinyl polymer latex was obtained by performing polymerization in the same manner as in Comparative Example 2. Subsequently, 100 parts of vinyl polymer powder (A-15) was obtained by performing coagulation of the latex in the same manner as in Comparative Example 1. Incidentally, the pH of the solidified slurry at this time was 6.5.

Comparative Example 4

A vinyl polymer latex was obtained by performing polymerization in the same manner as in Example 1, except that the emulsifier was changed to 1.0 part of sodium alkyl diphenyl ether disulfonate. 1.5 parts of aqueous dispersion of hindered phenol antioxidant (product name Irgastab MBS43EM (manufactured by Ciba JAPAN)) was added (as an effective component) to this vinyl polymer latex, and the mixture was stirred at normal temperature. 100 parts of vinyl polymer powder (A-16) was obtained by performing coagulation of the latex in the same manner as in Comparative Example 1. Incidentally, the pH of the solidified slurry at this time was 6.9.

The vinyl polymer powders produced in Examples 1 to 12 and Comparative Examples 1 to 4 were collectively presented in Table 2A, Table 2B, Table 3A, and Table 3B. Incidentally, the symbols described in Table 2A, Table 2B, Table 3A, and Table 313 mean compounds described in Table 4. The parts by mass of the emulsifiers in Table 2A and Table 2B are amounts with respect to 100 parts by mass of the vinyl monomer. In addition, the parts by mass of the coagulation agents are amounts with respect to 100 parts by mass of the polymer in the latex.

TABLE 2A

| | Vinyl polymer powder | Production condition of latex | | | | | Glass transition temperature (° C.) | Acid value (mgKOH/g) |
|---|---|---|---|---|---|---|---|---|
| | | Composition of vinyl monomer % by mass | Emulsifier | | Coagulation agent | | | |
| | | | Type | Part by mass | Type | Part by mass | Slurry pH | |
| Example 1 | A-1 | St/PhMA 87.5/12.5 | Sodium polyoxyethylene (6) alkyl ether phosphate | 1.0 | Sulfuric acid | 2.0 | 1.5 | 97 | 0.6 |
| Example 2 | A-2 | St/PhMA 87.5/12.5 | Sodium polyoxyethylene (4.5) lauryl ether acetate | 1.0 | Sulfuric acid | 0.5 | 2.2 | 94 | 1.0 |
| Example 3 | A-3 | St/αMeSt/PhMA←St/PhMA/ MMA/AMA 30/10/10←20/ 14.88/14.88/0.25 | Sodium polyoxyethylene (4.5) lauryl ether acetate | 2.0 | Sulfuric acid | 0.5 | 2.0 | 95 | 1.9 |
| Example 4 | A-4 | St/αMeSt/MMA←St/MMA/ AMA 30/10/10←20/29.75/0.25 | Sodium polyoxyethylene (4.5) lauryl ether acetate | 1.0 | Sulfuric acid | 0.5 | 2.1 | 98 | 1.1 |
| Example 5 | A-5 | St/αMeSt/PhMA←St/PhMA/ MMA/AMA 30/10/10←20/ 14.88/14.88/0.25 | Sodium polyoxyethylene (4.5) lauryl ether acetate | 2.0 | Sulfuric acid | 0.5 | 3.7 | 96 | 1.8 |

TABLE 2A-continued

| | Vinyl polymer powder | Composition of vinyl monomer % by mass | Emulsifier Type | Part by mass | Coagulation agent Type | Part by mass | Slurry pH | Glass transition temperature (° C.) | Acid value (mgKOH/g) |
|---|---|---|---|---|---|---|---|---|---|
| Example 6 | A-6 | St/PhMA 87.5/12.5 | Sodium polyoxyethylene (4.5) lauryl ether acetate | 1.0 | Sulfuric acid | 0.5 | 5.8 | 95 | 1.1 |
| Example 7 | A-7 | St/αMeSt/PhMA←St/PhMA/ MMA/BA/AMA 30/10/10←20/ 14.88/12.88/2/0.25 | Sodium polyoxyethylene (4.5) lauryl ether acetate | 2.0 | Sulfuric acid | 0.5 | 2.0 | 89 | 2.1 |
| Example 8 | A-8 | St/αMeSt/PhMA←St/PhMA/ MMA/BA/AMA 30/10/10←18.4/ 13.69/13.69/4/0.25 | Sodium polyoxyethylene (4.5) lauryl ether acetate | 2.0 | Sulfuric acid | 0.5 | 2.0 | 84 | 1.9 |
| Example 9 | A-9 | St/αMeSt/PhMA←St/PhMA/ MMA/BA/AMA 30/10/10←15.2/ 11.3/11.3/12/0.25 | Sodium polyoxyethylene (4.5) lauryl ether acetate | 2.0 | Sulfuric acid | 0.5 | 2.0 | 79 | 2.0 |

TABLE 2B

| | Vinyl polymer powder | Composition of vinyl monomer % by mass | Emulsifier Type | Part by mass | Coagulation agent Type | Part by mass | Slurry pH | Glass transition temperature (° C.) | Acid value (mgKOH/g) |
|---|---|---|---|---|---|---|---|---|---|
| Example 10 | A-10 | MMA/BA←MMA/BA 48/2←44/6 | Sodium polyoxyethylene (4.5) lauryl ether acetate | 1.0 | Sulfuric acid | 0.5 | 2.0 | 84 | 1.2 |
| Example 11 | A-11 | MMA/BA 85/15 | Sodium polyoxyethylene (4.5) lauryl ether acetate | 1.0 | Sulfuric acid | 0.5 | 2.0 | 76 | 1.2 |
| Example 12 | A-12 | MMA/BA 85/15 | Sodium polyoxyethylene (4.5) lauryl ether acetate | 1.0 | Sulfuric acid | 0.5 | 2.0 | 70 | 1.2 |
| Comparative Example 1 | A-13 | St/αMeSt/PhMA←St/PhMA/ MMA/AMA 30/10/10←20/ 14.88/14.88/0.25 | Sodium polyoxyethylene (4.5) lauryl ether acetate | 2.0 | Ca acetate | 5.0 | 6.5 | 97 | 2.0 |
| Comparative Example 2 | A-14 | St/PhMA 87.5/12.5 | Dipotassium alkenyl-succinate | 1.0 | Sulfuric acid | 0.5 | 2.3 | 97 | 2.7 |
| Comparative Example 3 | A-15 | St/PhMA 87.5/12.5 | Dipotassium alkenyl-succinate | 1.0 | Ca acetate | 5.0 | 6.5 | 99 | 0.3 |
| Comparative Example 4 | A-16 | St/PhMA 87.5/12.5 | Sodium alkyl diphenyl ether disulfonate | 1.0 | Ca acetate | 5.0 | 6.9 | 99 | 0.2 |

TABLE 3A

| | Vinyl polymer powder | Na and K contents (ppm) | | | Ca, Mg, and Al contents (ppm) | | | | Average molecular weight | | Bulk density (g/cm³) | Free flow (g/10 sec) |
|---|---|---|---|---|---|---|---|---|---|---|---|---|
| | | Na | K | Total | Ca | Mg | Al | Total | Mn | Mw | | |
| Example 1 | A-1 | 17 | 1.2 | 18 | 1.4 | 1.0 | 0.7 | 3 | 20,800 | 45,400 | 0.44 | 23 |
| Example 2 | A-2 | 16 | 0.3 | 16 | 1.0 | <0.3 | <0.6 | 1 | 21,900 | 47,300 | 0.39 | 30 |
| Example 3 | A-3 | 28 | <0.3 | 28 | <0.6 | <0.3 | 0.6 | 1 | 19,800 | 48,300 | 0.40 | 28 |
| Example 4 | A-4 | 15 | <0.3 | 15 | 1.0 | <0.3 | <0.6 | 1 | 19,600 | 52,800 | 0.47 | 22 |
| Example 5 | A-5 | 27 | <0.3 | 27 | 1.1 | <0.3 | 2.8 | 4 | 19,800 | 43,500 | 0.44 | 26 |
| Example 6 | A-6 | 36 | 0.5 | 37 | 1 | <0.3 | <0.6 | 1 | 22,200 | 45,800 | 0.36 | 22 |
| Example 7 | A-7 | 24 | <0.3 | 24 | <0.6 | <0.3 | <0.6 | 0 | 19,200 | 45,200 | 0.42 | 28 |
| Example 8 | A-8 | 38 | <0.3 | 38 | <0.6 | <0.3 | <0.6 | 0 | 20,400 | 51,900 | 0.37 | 27 |
| Example 9 | A-9 | 51 | <0.3 | 51 | <0.6 | <0.3 | <0.6 | 0 | 21,900 | 59,700 | 0.44 | 36 |

TABLE 3B

| | Vinyl polymer powder | Na and K contents (ppm) | | | Ca, Mg, and Al contents (ppm) | | | | Average molecular weight | | Bulk density (g/cm³) | Free flow (g/10 sec) |
|---|---|---|---|---|---|---|---|---|---|---|---|---|
| | | Na | K | Total | Ca | Mg | Al | Total | Mn | Mw | | |
| Example 10 | A-10 | 7 | 6 | 13 | <0.6 | <0.3 | <0.6 | 0 | 192,000 | 1,070,000 | 0.36 | 26 |
| Example 11 | A-11 | 6 | 6 | 12 | <0.6 | <0.3 | <0.6 | 0 | 390,000 | 3,320,000 | 0.34 | 26 |
| Example 12 | A-12 | 7 | 6 | 13 | <0.6 | <0.3 | <0.6 | 0 | 291,000 | 812,000 | 0.34 | 25 |
| Comparative Example 1 | A-13 | 4.8 | 0.4 | 5 | 680 | 1.2 | 0.6 | 682 | 18,100 | 42,400 | 0.37 | 15 |

TABLE 3B-continued

| Vinyl polymer powder | Na and K contents (ppm) | | | Ca, Mg, and Al contents (ppm) | | | | Average molecular weight | | Bulk density (g/cm³) | Free flow (g/10 sec) |
|---|---|---|---|---|---|---|---|---|---|---|---|
| | Na | K | Total | Ca | Mg | Al | Total | Mn | Mw | | |
| Comparative Example 2 | A-14 | 5.3 | 15 | 20 | 0.6 | <0.3 | <0.6 | 1 | 23,000 | 50,300 | 0.22 | 8.3 |
| Comparative Example 3 | A-15 | 1.4 | 3.0 | 4 | 960 | 0.8 | 2.2 | 963 | 23,600 | 51,000 | 0.27 | 15 |
| Comparative Example 4 | A-16 | 9.2 | 0.3 | 10 | 400 | 1.8 | 1.0 | 403 | 23,500 | 48,500 | 0.35 | 17 |

TABLE 4

| Abbreviation | Compound |
|---|---|
| St | Styrene |
| αMeSt | α-Methyl styrene |
| MMA | Methyl methacrylate |
| PhMA | Phenyl methacrylate |
| AMA | Allyl methacrylate |
| Ca acetate | Calcium acetate |
| Na | Sodium ion |
| K | Potassium ion |
| Ca | Calcium ion |
| Mg | Magnesium ion |
| Al | Aluminum ion |
| PC-1 | Aromatic polycarbonate resin "Iupilon S-2000F" manufactured by Mitsubishi Engineering-Plastics Corporation |
| PC-2 | Aromatic polycarbonate resin "Iupilon S-3000F" manufactured by Mitsubishi Engineering-Plastics Corporation |

Examples 13 to 25 and Comparative Examples 5 to 8

Each material was blended according to Table 5 and Table 6 to obtain polycarbonate resin compositions. Each resin composition was supplied to a unidirectional biaxial extruder (model name "PCM-30", manufactured by IKEGAI Corp.) and then melted and kneaded at a barrel temperature of 280° C. to obtain a pellet. The obtained pellets were used to evaluate the properties of the resin compositions, and the evaluation results were presented in Table 5 and Table 6. Incidentally, the symbols described in Table 5 and Table 6 mean the compounds described in Table 4.

TABLE 5

| | PC-1 % by mass | Vinyl polymer powder Type | % by mass | Initial YI | YI after retention | ΔYI | Spiral flow (mm) |
|---|---|---|---|---|---|---|---|
| Example 13 | 92.5 | A-1 | 7.5 | 1.9 | 2.2 | 0.3 | 315 |
| Example 14 | 92.5 | A-2 | 7.5 | 1.7 | 1.9 | 0.2 | 329 |
| Example 15 | 92.5 | A-3 | 7.5 | 19.0 | 19.2 | 0.2 | 336 |
| Example 16 | 90 | A-3 | 10 | 28.0 | 28.3 | 0.3 | 395 |
| Example 17 | 92.5 | A-4 | 7.5 | 61.7 | 61.8 | 0.1 | 323 |
| Example 18 | 92.5 | A-5 | 7.5 | 25.4 | 25.5 | 0.1 | 375 |
| Example 19 | 92.5 | A-6 | 7.5 | 2.3 | 2.8 | 0.5 | 351 |
| Example 20 | 92.5 | A-7 | 7.5 | 36.4 | 35.9 | less than 0.1 | 316 |
| Example 21 | 92.5 | A-8 | 7.5 | 58.7 | 59.0 | 0.3 | 279 |
| Example 22 | 92.5 | A-9 | 7.5 | 90.7 | 91.8 | 1.1 | 325 |
| Comparative Example 5 | 92.5 | A-13 | 7.5 | 30.3 | 37.8 | 7.5 | 449 |
| Comparative Example 6 | 92.5 | A-14 | 7.5 | 2.4 | 4.9 | 2.5 | 330 |
| Comparative Example 7 | 92.5 | A-15 | 7.5 | 2.8 | 5.8 | 3.0 | 355 |
| Comparative Example 8 | 92.5 | A-16 | 7.5 | 2.2 | 5.2 | 3.0 | 364 |

TABLE 6

| | PC-2 % by mass | Vinyl polymer powder Type | % by mass | Initial YI | YI after retention | ΔYI | Melt tension (mN) |
|---|---|---|---|---|---|---|---|
| Example 23 | 97 | A-10 | 3 | −12.4 | −13.0 | less than 0.1 | 1.8 |
| Example 24 | 97 | A-11 | 3 | −9.8 | −10.5 | less than 0.1 | 2.3 |
| Example 25 | 97 | A-12 | 3 | −12.7 | −12.4 | 0.3 | 2.3 |

As clearly seen from Examples 1 to 12, the vinyl polymer powder of the invention was excellent in powder property. Moreover, as clearly seen from Examples 13 to 25, the resin composition blended with the vinyl polymer powder of the invention was excellent in molding processability, was less likely colored even when the resin composition is molded after being retained under high temperature, and was excellent in thermal stability at the time of high-temperature molding.

In the vinyl polymer powders of Comparative Examples 1, 3, and 4, since a calcium salt was used for coagulation of the vinyl polymer latex, calcium ions were contained in more than 350 ppm, and as a result, the powder property was poor. In addition, since the vinyl polymer powder of Comparative Example 2 was polymerized in the presence of an emulsifier other than the non-ionic/anionic emulsifier and was coagulated using sulfuric acid, the acid value was high and the powder property was poor. Further, since the resin compositions of Comparative Examples 5, 7, and 8 were blended with the vinyl polymer powder containing more than 350 ppm of calcium ions, thermal stability was poor. Since the resin composition of Comparative Example 6 was blended with the vinyl polymer powder having a high acid value, thermal stability was poor.

INDUSTRIAL APPLICABILITY

According to the invention, it is possible to provide a vinyl polymer powder which is mixed with an engineering plastic so that a resin composition having excellent molding processability and high thermal stability at the time of high-temperature molding can be obtained and which is also excellent in powder property. In addition, it is possible to provide a thermoplastic resin composition having excellent molding processability and high thermal stability at the time of high-temperature molding and a molded body using the same.

The molded body of the invention is useful in representative fields such as the OA equipment field, the electrical/electronic equipment field, and the building material field, and in a wide range of other fields.

EXPLANATIONS OF LETTERS OR NUMERALS

40 TRAY
41 SEAT
42 SHUTTER
43 FUNNEL
44 SUPPORT
45 SUPPORT ROD

The invention claimed is:

1. A method for producing a vinyl polymer powder, the method comprising:
Step (1): a step of obtaining a vinyl polymer latex having a glass transition temperature of 0° C. or higher, provided that, when there are a plurality of glass transition points, all of the glass transition temperatures are 0° C. or higher, by subjecting a vinyl monomer to emulsion polymerization in the presence of a non-ionic/anionic emulsifier; and
Step (2): a step of preparing a slurry having a pH of 6 or less by coagulating the vinyl polymer latex, then generating a precipitate, and recovering the precipitate as a vinyl polymer powder,
wherein the non-ionic/anionic emulsifier has a non-ionic hydrophilic moiety and an anionic hydrophilic moiety in a same molecule, and
the vinyl polymer powder contains a particle having a diameter of 38 μm or less in an amount of 0 to 15% by mass.

2. The method for producing a vinyl polymer powder according to claim 1, wherein an ionic hydrophilic moiety of the non-ionic/anionic emulsifier is a carboxylic acid or a salt thereof, or a phosphoric acid or a salt thereof.

3. The method for producing a vinyl polymer powder according to claim 1, wherein the vinyl polymer latex is coagulated using an acid in Step (2).

4. The method for producing a vinyl polymer powder according to claim 1, wherein a pH of the slurry in Step (2) is 4 or less.

5. The method for producing a vinyl polymer powder according to claim 1, wherein:
the vinyl polymer powder comprises a vinyl polymer,
a glass transition temperature of the vinyl polymer is 0° C. or higher (provided that, when there are a plurality of glass transition points, all of the glass transition temperatures are 0° C. or higher),
the total content of magnesium ions, calcium ions, aluminum ions, barium ions, and zinc ions in the vinyl polymer powder is 350 ppm or less with respect to the total mass of the vinyl polymer powder,
the content of ammonium ions is 100 ppm or less with respect to the total mass of the vinyl polymer powder,
an acid value is 2.5 mgKOH/g or less, and
a bulk density is 0.10 to 0.60 g/cm$^3$.

6. The method for producing a vinyl polymer powder according to claim 1, wherein free flow property of the vinyl polymer powder as measured by the following method is 15 g/10 sec or more;
[Measurement Method for Free Flow Property]
a measurement instrument, which includes a seat on which a tray is set, a funnel provided with a shutter at a cylindrical opening thereof which has an inner diameter of an upper part at 8 mm and an inner diameter of a lower part at 20 mm, a support holding the funnel above the seat, and a support rod to which the support is fixed, is placed in a horizontal site;
the shutter of the funnel is closed, and 120 cm$^3$ of powder is uniformly put into the funnel; subsequently, the shutter is opened to drop the powder, and immediately, the tray is set on the seat;
at the same time of setting the tray, the counting of time starts by using a stopwatch, and after 10 seconds, the tray is removed from the measurement instrument;
the tray containing the powder is weighed to obtain the amount of the powder dropped for 10 seconds; and
the above measurement is carried out two times, and an average value of the amounts of the powder dropped for 10 seconds is obtained and this value is designated as the free flow property (g/10 sec).

7. The method for producing a vinyl polymer powder according to claim 1, wherein the total content of sodium ions and potassium ions in the vinyl polymer powder is 100 ppm or less with respect to the total mass of the vinyl polymer powder.

8. The method for producing a vinyl polymer powder according to claim 1, wherein the vinyl polymer powder comprises:
0.5 to 99.5% by mass of a (meth)acrylate ester unit which contains an alkyl group having 1 to 4 carbon atoms or an aromatic group in an ester moiety;
0.5 to 99.5% by mass of an aromatic vinyl monomer unit; and a vinyl polymer having a glass transition temperature of 0° C. or higher (provided that, when there are a plurality of glass transition points, all of the glass transition temperatures are 0° C. or higher), wherein the vinyl polymer powder satisfies the following Conditions [1] and [2];

Condition [1]:
  a bulk density as measured according to JIS K6720 is 0.30 to 0.60 g/cm$^3$;

Condition [2]:
  free flow property as measured by the following method is 20 g/10 sec or more;

[Measurement Method for Free Flow Property]
  a measurement instrument, which includes a seat on which a tray is set, a funnel provided with a shutter at a cylindrical opening thereof which has an inner diameter of an upper part at 8 mm and an inner diameter of a lower part at 20 mm, a support holding the funnel above the seat, and a support rod to which the support is fixed, is placed in a horizontal site;
  the shutter of the funnel is closed, and 120 cm$^3$ of powder is uniformly put into the funnel; subsequently, the shutter is opened to drop the powder, and immediately, the tray is set on the seat;
  at the same time of setting the tray, the counting of time starts by using a stopwatch, and after 10 seconds, the tray is removed from the measurement instrument;
  the tray containing the powder is weighed to obtain the amount of the powder dropped for 10 seconds; and
  the above measurement is carried out two times, and an average value of the amounts of the powder dropped for 10 seconds is obtained and this value is designated as the free flow property (g/10 sec).

9. The method for producing a vinyl polymer powder according to claim 1, wherein the non-ionic/anionic emulsifier comprises a polyoxyethylene alkyl ether acetate, wherein a number of carbon atoms of alkyl group is 4 to 20.

10. The method for producing a vinyl polymer powder according to claim 1, wherein the non-ionic/anionic emulsifier comprises a polyoxyethylene alkyl ether acetate, wherein a number of carbon atoms of alkyl group is 8 to 20.

11. The method for producing a vinyl polymer powder according to claim 1, wherein the non-ionic/anionic emulsifier comprises a polyoxyethylene alkyl ether acetate, wherein an average addition molar number of ethylene oxide is 1 to 12.

12. The method for producing a vinyl polymer powder according to claim 1, wherein the non-ionic/anionic emulsifier comprises a polyoxyethylene alkyl ether acetate, wherein an average addition molar number of ethylene oxide is 3 to 12.

13. The method for producing a vinyl polymer powder according to claim 1, wherein the non-ionic/anionic emulsifier comprises a sodium polyoxyethylene lauryl ether acetate.

14. The method for producing a vinyl polymer powder according to claim 1, wherein the non-ionic/anionic emulsifier comprises a polyoxyethylene phenyl ether phosphate.

15. The method for producing a vinyl polymer powder according to claim 1, wherein the non-ionic/anionic emulsifier comprises a polyoxyethylene alkyl phenyl ether phosphate.

16. The method for producing a vinyl polymer powder according to claim 1, wherein the non-ionic/anionic emulsifier comprises a polyoxyethylene alkyl ether phosphate.

* * * * *